Figures 1, 2:
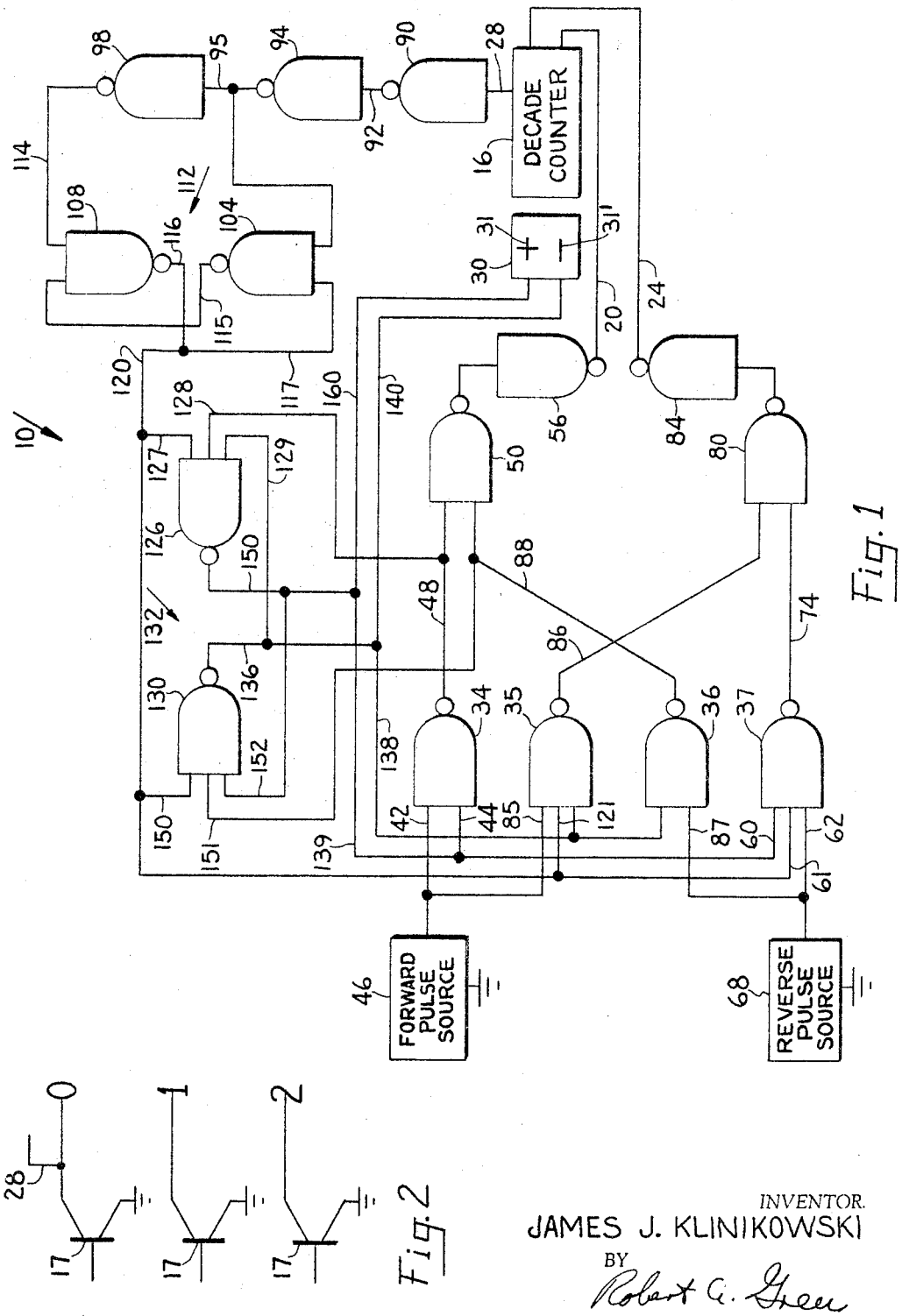

Sept. 13, 1966     J. J. KLINIKOWSKI     3,272,971

ELECTRONIC COUNT ACCUMULATOR

Filed Feb. 5, 1963

INVENTOR.
JAMES J. KLINIKOWSKI
BY
Robert G. Green
ATTORNEY

United States Patent Office 3,272,971
Patented Sept. 13, 1966

1

3,272,971
ELECTRONIC COUNT ACCUMULATOR
James J. Klinikowski, Somerville, N.J., assignor to Burroughs Corporation, Detroit, Mich., a corporation of Michigan
Filed Feb. 5, 1963, Ser. No. 256,384
1 Claim. (Cl. 235—92)

This invention relates to electronic counting circuits and, particularly to counting circuits which can count in forward and reverse directions and can accumulate the count and provide an instantaneous visual indication of the true total count present in the circuit.

The objects of the present invention concern the provision of an improved counting circuit and count accumulating circuit which can provide a true total count instantaneously and which can provide a visual indication of the accumulated count and its correct sign. The objects of the invention also concern the provision of such a circuit in relatively simple form and made up of a plurality of relatively simple building blocks.

Although counting circuits are known in the prior art, none of these circuits operates in the manner of the counting circuit of the invention. In addition, none of the prior art circuits is as simple in construction as the circuit of the invention.

Briefly, a count accumulating circuit according to the invention includes a counter circuit which is adapted to count in both forward and reverse directions from a zero reference count, with the counting operation being considered forward when the total is increasing in magnitude in either direction away from zero and reverse when the total is decreasing in magnitude toward zero. Forward and reverse count input lines are coupled to the counter circuit, and sources of forward and reverse counting signals are coupled thereto through an array of gating circuits. Polarity indicator means having means for representing the polarity of the instantaneous total count in the counter circuit is also provided. A sensing means is coupled to the counter circuit for sensing a counting change in either direction through zero count, and this sensing means is also coupled to the signal sources to control the operation thereof in accordance with the magnitude of the content of the counter and its polarity. An auxiliary control means is provided coupled between the sensing means and both the signal sources and polarity indicator means. This auxiliary control means operates the polarity indicator means.

In operation of the accumulator, if there is zero count in the counter circuit, the sensing means controls the inputs from the signal sources so that a first input counting signal is applied in the forward direction, whether it is positive or negative in polarity. The first input signal is thus applied to the counter, and it is also applied to the control means in such a way that the correct polarity of the count is indicated by the polarity indicating means. All subsequent pulses are applied either in the forward or reverse direction, with the polarity remaining the same, unless the counter is driven through zero.

In the drawing:
FIG. 1 is a schematic representation of a circuit embodying the invention; and
FIG. 2 is a schematic representation of a portion of a circuit which may be included in the circuit of FIG. 1.

Referring to the drawing and to FIG. 1, the accumulator circuit of the invention 10 includes a counter module 16 which may comprise one or more series-connected counter circuits which are of a type capable of counting in forward and reverse directions. The counter circuits may be decade counters or the like. Counter circuits are well known and need not be shown in complete detail. A portion of a typical transistor counter and associated indicator device are shown in FIG. 2. Such a counter, when used as a decade counter, includes ten discharge devices, for example transistors 17, each of which comprises a counting stage, with the output of each transistor being connected to a suitable visual indicator or display device. One suitable visual indicator is the 6844–A cold cathode indicator tube which contains ten cathode numbers, including numerals "0" to "9," inclusive. The numbers are cold cathode electrodes, and glow is produced when a suitable potential is connected between a cathode and the tube anode. As shown in FIG. 2, the output of the transistor representing "0" count is connected to the "0" cathode, the output of the transistor representing a count of "1" is connected to the cathode numeral "1," etc. The output of the "0" count transistor is also provided with an auxiliary output lead 28 for a purpose to be described. If more than one counter circuit is provided, each counter is suitably coupled to the next counter in the series to properly carry the count from one counter to the next. With more than one counter in the module 16, a multiple digit number may be accumulated in the circuit 10. A forward count input line 20 and a reverse count input line 24 are coupled to counter 16 for applying forward and reverse counting pulses thereto.

In general, the following description is written as though one decade counter were provided in counter module 16.

Referring to FIG. 1, the accumulator 10 includes a polarity indicator device 30 associated with the counter module 16 for displaying the polarity of the count accumulated therein. The device 30 may be a cold cathode indicator tube which is provided with two glow cathodes in the form of a plus sign 31 and a minus sign 31'.

The circuit of the invention utilizes a plurality of conventional inverting AND gates or NAND gates, as they are known, which operate with "1" and "0" signal logic levels. In the embodiment of the invention described below, a logical "1" signal or level represents a positive potential of about 6 volts, and a logical "0" signal or level represents a potential of zero volts. Those skilled in the art will understand that other signal levels and logic may be used in practising the invention. The NAND gates have a single output, and they may have two, three, or more inputs as required. With gates of this type and with the selected logic levels, a "0" at the input of a gate provides a "1" at the output and no additional "0" or "1" inputs can change the state of the gate. In the circuit shown and with the selected logic, one or the other or both of the plus or minus cathodes in tube 30 glows when a logical "1" level is applied to one or to both.

For convenience, henceforth, the NAND gates will be designated simply as gates. Four gates 34, 35, 36, 37, which comprise pulse input gates, are coupled to the forward and reverse input lines 20 and 24, respectively, as follows. The first gate 34 includes two input leads 42 and 44, one of which, for example 42, is connected to a source 46 of positive pulses which have a logical "1" level. The output of gate 34 is coupled by lead 48 to the input of a gate 50, and the output of gate 50 is coupled through one or more auxiliary gates 56 to the forward count input line 20 to the counter itself. The gates 56 are provided in sufficient number to insure that each forward count signal or pulse which appears at line 20 has the proper polarity for application to the counter 16. With the arrangement shown, the signal which appears on line 20 has a logical "0" level. The fourth gate 37 has three input leads 60, 61, 62, with lead 60 being coupled to a source 68 of reverse or subtract pulses which also have a logical "1" level. The output of gate 37 is coupled by lead 74 to the input of a gate 80, the output of which is coupled through one or more auxiliary gates 84, provided for obtaining the desired pulse polarity, to the reverse input line 24 to the counter 16. Reverse pulses which appear on lead 24 also have a logical "0" level. The second gate 35 has one input lead 85 coupled to the source 46 of forward count pulses, and its output is coupled by lead 86 to the input of gate 80. The third gate 36 has one input lead 87 coupled to the source 68 of reverse count pulses, and its output is coupled through lead 88 to gate 50. Other connections are made to the gates 34, 35, 36, 37, and these will be described below.

The lead 28 from the zero count stage of the counter 16 is coupled to the input of a gate 90, the output of which is coupled by lead 92 to the input of another gate 94, and the output of gate 94 is coupled by lead 95 to the input of a third gate 98. If more than one decade counter is included in the counting unit 16, each zero count lead 28 is connected to a separate gate 90, and all of the gates 90 are coupled into gate 94. A pair of gates 104 and 108 are connected as a flip-flop 112, with the output of gate 94 being coupled by lead 113 to the input of gate 104, and the output of gate 98 being coupled by lead 114 to the input of gate 108. The output of gate 104 is also coupled by lead 115 to the input of gate 108, and the output of gate 108 is coupled by leads 116 and 117 to the input of gate 104. The output of gate 108 is also coupled through leads 116 and 120 to input lead 121 to gate 35 and to input lead 61 of gate 37.

The accumulator circuit 10 also includes two gates 126 and 130 connected as a flip-flop 132. The gate 126 includes three input leads 127, 128, 129, one of which 127 is coupled to lead 120 and thus to the output of gate 108, the second of which 128 is coupled to lead 48 and the output of gate 34, and the third of which 129 is coupled: to lead 136 and to the output of gate 130, to lead 138 and to the input of gates 35 and 36, and to lead 140 to the device 30 for energizing and displaying the minus sign electrode 31'. Gate 130 of the flip-flop 132 includes three input leads 150, 151, 152, one of which 150 is coupled to lead 120, another of which 151 is coupled to lead 88, and the third of which is coupled: to lead 150 to the output of gate 126, to lead 139 to the input of gates 34 and 37, and to lead 160 to device 30 for energizing and displaying the plus sign electrode 31.

The actual switching on of the indicator electrodes 31 and 31' may be achieved by means of transistors, the inputs of which are connected to leads 140 and 160, and the outputs of which are connected to the polarity indicator electrodes. It is assumed that such switching means is included in block 30.

In operation of the accumulator circuit 10, initially, assuming that there is no count in the counting unit 16 and that the "0" stage of the counter and the "0" indicator cathode are energized, then according to the circuit logic, a "0" logic level is present on line 28. This represents a "0" level input to gate 90, with a resultant "1" level at the output of gate 90. The "1" output at gate 90 appears as a "0" output for gate 94 and a "1" output for gate 98. The "0" output from gate 94 is applied to gate 104, with a resultant "1" output at gate 104. This "1" output is applied to the input of gate 108, and a "0" output appears at gate 108 and on lead 120. Thus, a "0" input is applied to gates 35 and 37. Thus, in effect, gates 35 and 37 are "0" blocked, and a "1" input signal level will not be passed by either gate into the reverse count line 24. Thus, the first counting pulse which is applied, whether it is a forward or reverse count, will be applied to the forward line of the counter as desired, with the correct polarity indication for the count being provided in indicator 30. This is described further below.

Both gates 126 and 130 thus have "0" inputs and "1" outputs so that "1" logic levels are applied through both leads 140 and 160 to polarity indicator device 30. Thus, in accordance with the arrangement shown and described, both plus and minus electrodes 31 and 31' are energized and both electrodes glow and are visible. This is the selected logic condition for the situation that exists when there is zero count in the counter 16.

Let it be assumed that the first counting pulse to be applied to the accumulator 10 is a forward or add pulse applied by source 46. Since gate 35 is blocked, the first count, which has a "1" logic level, passes through gate 34 and gates 50 and 56 and through lead 20 into the counter where a forward count is entered. Thus, a count of "1" is entered in the counter and the visual indicator shows this count of "1" with a glowing cathode numeral "1." Since the "0" stage of the counter is now not energized, line 28 assumes logic level "1," and, by following the signal reversals through gates 90, 94, 98 and flip-flop 112, it can be seen that a logic "1" level now appears at lead 120, and gates 35 and 37 are open. The logic "1" level of the input pulse which is applied to the input of gate 34 appears as a "0" level at the output of gate 34. This "0" level is coupled through the lead 128 to the input of gate 126 so that a logic "1" appears at the output of gate 126 and is coupled to the plus indicator 31 in device 30. Thus, "0" level is coupled to the minus sign electrode 31' which the plus sign 31 remains on. At the same time, the "1" level on the lead 120 is applied to the input of gate 130 and a "0" level appears at the output of gate 130. This "0" level is coupled to the minus sign electrode 31' which is thus turned off. Each subsequent forward pulse applied by source 46 is coupled by lead 20 to the counter 16, and the count shown by the indicator increases in a positive direction. Since the flip-flop 132 has already been reset to turn on the plus electrode 31, subsequent forward pulses do not affect this flip-flop or the plus sign which accompanies the counter operation.

The result of the application of reverse or subtract pulses from source 68 to the accumulator 10 will now be considered. First, it should be noted that the "0" logic level on lead 140 to the minus sign electrode 31' is applied through lead 138 to the input of gates 35 and 36 which are thus blocked. Now, with some positive number present in the counter, if a reverse or subtract signal having a logic "1" level is applied to the accumulator 10, it cannot pass through gate 36 since this gate is blocked. It can, however, pass through gates 37, 80, and 84 and through reverse lead 24 to the counter, where it reverses the entered count by one unit count. It can be seen that a reverse or subtract pulse thus does not affect the flip-flop 132 and does not change the indicator sign of device 30. Thus, all subsequent reverse counts applied by source 68 remove one count from the total count accumulated in the counter until the counter again reaches "0." When this happens, the counter reverts to the logic state described above for the condition which exists where there is no count in the counter. Thus, it can be seen that, with a positive number in the accumulator, forward and reverse pulses may be interspersed to change the accumulated count without changing the sign thereof.

Let it be assumed that there is zero count in the counter and that the first pulse applied is a reverse pulse applied by source 68. As described above, with no count in the counter, the logic is such that logic "0" appears on lead 120 and gates 35 and 37 are blocked and only the forward line to counter 16 is open. Thus, a reverse pulse applied by source 68 appears as a logic "1" at the input of gate 36 and a logic "0" appears at the output of gate 36. This "0" level passes through gates 50 and 56 and through lead 20 to register one count in the counter on the forward line. At the same time, the logic "0" is applied through the line 151 to the input of gate 130. This places a logic "1" at the output of gate 130, and the minus sign electrode 31' is energized. At the same time, the logic "1," which appears at the input of gate 126 when a count is entered in the counter, as described above, provides a logic "0" at the output of gate 126 and the plus sign electrode 31 is not energized.

It is to be noted that the logic "0" at the output of gate 126 is applied to, and blocks, gates 34 and 37. Subsequent reverse pulses applied by source 68 to the accumulator 10 are applied through the forward lead 20 to the counter so that the negative number in the counter increases in magnitude.

Consider now the operation of the circuit when a negative number is present in the counter 16 and a forward pulse, having logic "1," is applied to the circuit by source 46. Since gate 34 is blocked, the applied pulse cannot be applied to the counter through the forward line 20. However, the input pulse passes through gate 35 and gates 80 and 84 and through reverse line 24 to the counter where the count is reversed and the entered negative number is reduced by one. The state of the flip-flop 132 and the state of indicator 30 are not affected at this time. Subsequent forward pulses which are applied similarly reduce the size of the negative number in the counter until once again "0" count is reached and the logic condition described above is again reestablished.

In the above-described operation of the invention, it can be seen that when a zero count is present in the counter, the next count input, whether forward or reverse, will be applied to the forward input to the counter 16, with the polarity of the count being shown by the proper indicator in device 30. In addition, if a positive number is present in the counter 16, both forward and reverse pulses may be applied alternately to increase or decrease the magnitude of this number without changing the sign of the number. Similarly, if a negative number is present in the counter, both forward and reverse pulses may be applied alternately to change the magnitude of this number without changing the sign of this number.

The present invention thus provides an electronic count accumulator which is relatively simple in construction and which automatically provides a true total count and indicates the polarity of this count.

What is claimed is:

A count accumulating circuit, in which all gates are NAND gates, comprising:
 a first gate having two inputs and an output,
 a second gate having three inputs and one output,
 a source of forward count pulses coupled to one input of each of said first and second gates,
 a third gate having two inputs and one output,
 a fourth gate having three inputs and one output,
 a source of reverse count pulses coupled to one input of each of said third and fourth gates,
 a fifth gate having two inputs and an output,
 a sixth gate having one input and one output and having its input coupled to the output of said fifth gate,
 the output of said first gate being coupled to an input of said fifth gate,
 a seventh gate having two inputs and one output,
 the output of said fourth gate being coupled to an input of said seventh gate,
 an eighth gate having one input and one output and having its input coupled to the output of said seventh gate,
 the output of said third gate being coupled to one input of said fifth gate,
 the output of said second gate being coupled to one input of said seventh gate,
 a reversible decade counter having a forward count input line and a reverse count input line and an output, the forward count input line being coupled to the output of said sixth gate, the reverse count input line being coupled to the output of said eighth gate,
 a control flip-flop comprising ninth and tenth gates each having three inputs and one output,
 the output of each of said flip-flop gates being coupled to one input of the other,
 the output of said third gate being coupled also to one input of said ninth gate,
 the output of said first gate also being coupled to an input of said tenth gate,
 the output of said ninth flip-flop gate also being coupled to one input of each of said second and third gates and to a minus sign indicator,
 the output of said tenth gate also being coupled to one input of each of said first and fourth gates and to a plus sign indicator,
 the output of said decade counter being coupled to the single input of an eleventh gate, the output of which is coupled to the single input of a twelfth gate,
 the output of said twelfth gate being coupled to the single input of a thirteenth gate which has one output,
 the output of said twelfth gate also being coupled to an input of a fourteenth gate, the output of which is coupled to an input of a fifteenth gate,
 the output of the thirteenth gate being coupled to a second input of the fifteenth gate,
 the output of the fifteenth gate being coupled both to an input of the fourteenth gate and to an input of each of said ninth and tenth flip-flop gates and to an input of said second and fourth gates,
 the states of said ninth and tenth flip-flops gates being determined by the polarity of the count in the decade counter, said flip-flop gates controlling the operation of said plus and minus signs and further controlling the states of said first, second, third, and fourth gates and the path into the forward or reverse counting lines of the decade counter whereby the correct count sign is operated and counting pulses are automatically applied to the decade counter in the proper direction.

References Cited by the Examiner

UNITED STATES PATENTS 2,964,241   12/1960   Rosenberg et al.  _____ 235—92
2,970,759   2/1961   Lanning  _____ 235—92

MAYNARD R. WILBUR, *Primary Examiner.*

J. F. MILLER, *Assistant Examiner.*